C. E. STRONG.
VALVE.
APPLICATION FILED JUNE 5, 1909.

957,811.

Patented May 10, 1910.

Witnesses
J. M. Fowler Jr.
W. L. Kitchin.

Inventor
Charles E. Strong
By Mason Fenwick & Lawrence
his Attorneys

UNITED STATES PATENT OFFICE.

CHARLES E. STRONG, OF AMITYVILLE, NEW YORK.

VALVE.

957,811.

Specification of Letters Patent.   Patented May 10, 1910.

Application filed June 5, 1909.   Serial No. 500,318.

*To all whom it may concern:*

Be it known that I, CHARLES E. STRONG, a citizen of the United States, residing at Amityville, in the county of Suffolk and State of New York, have invented certain new and useful Improvements in Valves; and I do hereby declare the following to be a full, clear, and exact description of the invention, such as will enable others skilled in the art to which it appertains to make and use the same.

This invention relates to improvements in valves, and particularly to what are known as rubber valves, and has for an object the arrangement of means in a valve for rotating the valve automatically by the action of the fluid passing therethrough.

Another object of the invention is the arrangement of a valve having projecting members arranged at an angle to the flow of fluid through the valve, so that upon the opening of the valve and the closing of the same the fluid flowing therethrough will partially rotate the valve.

A still further object of the invention is the arrangement of a rubber valve member adapted to be moved from its seat upon the passage of fluid through the valve, said valve member being formed with projections that are beveled or have formed thereon inclined surfaces against which the fluid passing through the valve acts for giving a rotary motion to the valve member as the same moves off its seat and again back upon its seat.

With these and other objects in view the invention comprises certain novel constructions, combinations and arrangement of parts as will be hereinafter more fully described and claimed.

Figure 1:
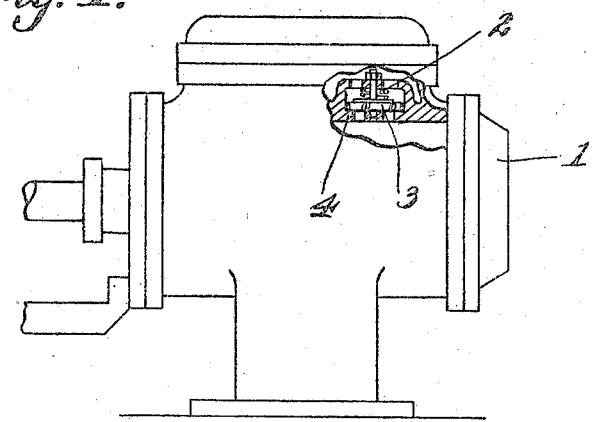
Figure 4:
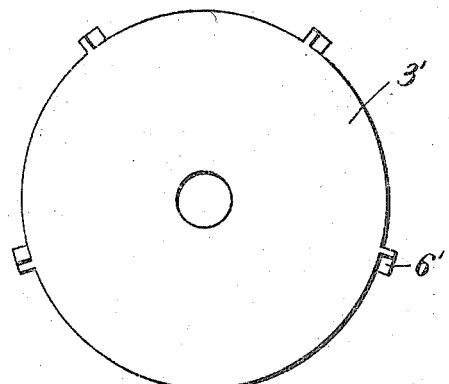
Figure 2:
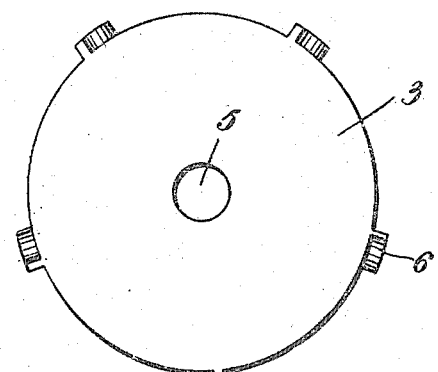
Figure 5:
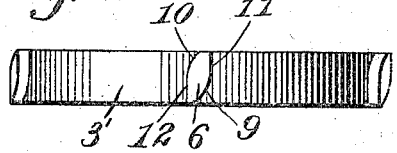
Figure 3:
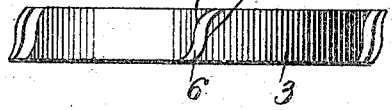

In the accompanying drawings: Figure 1 is a side elevation of a pump, certain parts being broken away to disclose the invention. Fig. 2 is a top plan view of a valve member removed. Fig. 3 is an edge view of the valve member shown in Fig. 2. Fig. 4 is a top plan view of a slightly modified form of valve member. Fig. 5 is an edge view of the structure shown in Fig. 4.

In the construction of valves, and particularly to what are known as rubber pump valves, the rubber valve member arranged in the valve is forced from its seat upon each pulsation of the pump, and again reseated. This unseating and reseating of the valve member will of course wear the same in the course of time, especially as the valve member is reseated in the same place each time. After the valve member has been used for some time it has often been found that the grooves or worn places in the valve member will be engaged by the fluid passing through the valve, and the valve member slightly rotated. This slight rotation of the valve member will cause the same to leak as the same is not seated in the worn places, and consequently is held from forming a tight joint. In the valve embodying the invention means are presented for overcoming this objection as the valve member is adapted to be continuously and automatically rotated for wearing the same evenly, and thus preventing any leaking by being seated upon a rough place.

Referring to the drawing by numerals, 1 indicates a pump of any desired kind, in which is arranged a valve 2 having a valve member 3 adapted to engage its seat 4 when not raised by the pressure of fluid passing therethrough. The valve member 3, as more clearly shown in Figs. 2 and 3, is formed of a disk having an aperture 5 for permitting the passage of a guiding rod therethrough. Secured to or formed integral with disk 3 are a plurality of projections 6 that are curved at 7 and 8, preferably in substantially a compound-curve, on opposite sides of the projections. By this construction and arrangement blades are formed on the disk against which the fluid may press for rotating the disk whenever the disk is not held against rotation. By having the curved surfaces 7 and 8 as shown either side of the valve member 3 may be placed against the seat and the fluid passing through the valve will operate equally upon the projections or blades 6 for rotating the valve member. The valve member 3 may be made of any desired material, but preferably of rubber, and is particularly adapted to be used in what is known as rubber pump valves.

In Figs. 4 and 5 will be seen a slightly modified form of the invention, in which a valve member 3' is provided with projections 6' having curved surfaces 9 and 10 upon opposite sides of the projections 6'. Projections 6' also have straight surfaces 11 and 12. The curved surfaces 9 and 10 are adapted to be engaged by fluid passing through the valve, whereby the valve member 3' is rotated. By providing the curved surfaces 9 and 10 in the modified form, and the curved surfaces 7 and 8 in the preferred form, the valve member may be reversed or put on either side down, as desired, and operate with equal advantage. By the use of the disk arrangement of valve members 3 and 3'; and the lugs, arms or wings 6 and 6', means are provided for presenting an efficient valve member, and one that in operation will move forward in a rotary motion upon each pulsation.

What I claim is:

1. In a valve, a reciprocating valve member, peripheral arms projecting from said valve member formed substantially in the shape of a compound curve having a part of the sides thereof flattened at diagonal corners for causing the valve member to rotate upon the passage of fluid through the valve.

2. In a valve, a valve member formed substantially disk-shaped, and arms arranged on the periphery thereof extending substantially in a general direction parallel with the axis of the valve member and formed with walls having diagonal rounded corners and merging into diagonal flattened corners.

3. In a valve, a valve member formed substantially disk-shaped, and a plurality of arms each formed with a plurality of curved surfaces arranged to be acted upon by fluid passing through the valve for rotating the same in one direction regardless of which side of the valve member is uppermost, each of said arms being arranged substantially parallel to the axis of the valve member and located upon the periphery thereof.

4. In a valve, a disk shaped valve member, a plurality of arms arranged on the periphery thereof formed with beveled surfaces upon opposite sides and arranged in opposition to each other, whereby the arms may engage the fluid passing through the valve, regardless of which side of the valve member is uppermost.

5. In a valve, a reciprocating disk-shaped valve member formed with spaced peripheral arms, each of said arms extending in a general direction parallel with the axis of the valve member and formed with diagonal corners rounded in order to cause the valve member to partially rotate upon each unseating thereof regardless of which side is uppermost.

In testimony whereof I affix my signature in presence of two witnesses.

CHARLES E. STRONG.

Witnesses:
 Louis Chas. Kyselka,
 K. M. Strong.